Figure 1:
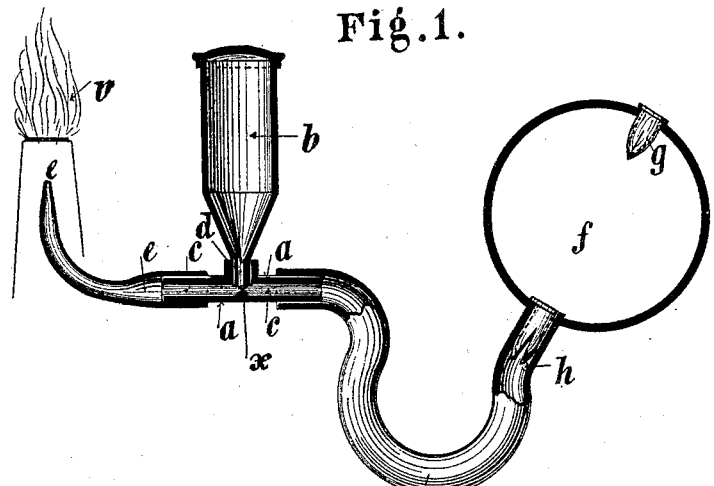

(No Model.)

J. W. C. C. SCHIRM.
SEMAPHORE.

No. 395,405. Patented Jan. 1, 1889.

Witnesses.  Inventor.

UNITED STATES PATENT OFFICE.

JOHN WILLIAM CHARLES COWEN SCHIRM, OF BRESLAU, PRUSSIA, GERMANY.

SEMAPHORE.

SPECIFICATION forming part of Letters Patent No. 395,405, dated January 1, 1889.

Application filed October 10, 1888. Serial No. 287,771. (No model.)

*To all whom it may concern:*

Be it known that I, JOHN WILLIAM CHARLES COWEN SCHIRM, of Breslau, in the Kingdom of Prussia, German Empire, have invented a new and useful Improvement in Semaphores, of which the following is a specification.

My invention relates to an improved semaphore or optical telegraph; and it consists in the various improvements hereinafter described and claimed.

In recent times optical signals or semaphores and the apparatus therefor employed have in many cases been replaced by electric-telegraph apparatus. But in many cases the electrical apparatus cannot be employed with advantage, being dependent on long conductors, and frequently the semaphore is the only possible means of establishing communication between distant places.

In the marine service, for the watch of the coast, (coast-ships, beacons, &c.,) as well as in a besieged fortress, intelligence and warning must principally be given by optical signals, and for the army service an apparatus light and portable, easy to manage, and reliable in its effect for a great distance—for instance, in reconnoitering, and with the outguards would be equally of the greatest utility. Owing to this desideratum a considerable number of devices for giving optical signals have in the course of time been offered, but all of them fail to answer the requirements inseparable from an apparatus which is destined for the army use. Most apparatuses are either deficient in power of effect, or they were of too complicated a construction and liable to breakage or disorder, or their application depended upon sunlight, or their management and operation was too cumbersome and slow for the purpose in view.

As far as I am aware, no apparatus has hitherto existed which enables to transmit at night intelligence of sufficient length and in a short space of time to great distance by optical signals—an apparatus which at the same time is of simple construction, of moderate size, and portable.

The herein-described semaphore answers all the requirements and avoids all inconveniences connected with the various devices hitherto known.

The nature of my improved apparatus allows of its construction and general arrangement being modified within wide limits. It may be mounted stationary or made portable. Its size may be varied according to any lighting power required. The construction is of the utmost simplicity, as also its working management, whereby all probability and even possibility of a failure or unsatisfactory working effect is as much as possible suppressed. Owing to its simple construction, this improved apparatus, further, will be so cheap and the expense of working the same is so small its operation may be worked by any reasonable person, and is so easily to be understood that its adoption for general use in transmitting optical signals can find no objection.

An important advantage of this apparatus is that its use is not dependent on the change of weather, the material for working the apparatus can easily be provided for anywhere, and its bulk is so small that sufficient quantities of it may easily be carried along in the soldier's knapsack or pockets without giving inconvenience.

The general plan and construction of my improved apparatus are based upon the fact that magnesium powder blown by convenient means into a flame in minimum quantities produces bright flashes of most intensive light, which are visible at great distances.

The construction of the improved apparatus consists mainly of a device by which an extremely small quantity of magnesium powder is fed in equal adjustable portions into a blast-pipe, through which it is blown at the will and control of the operator into a flame, where it burns and flashes like lightning. The blast, working at the will of the operator, thus produces flashes of intensive light to be seen at wide distances, and these flashes may be so timed in their succession with suitable and distinct intervals to constitute a means of intelligence like the Morse telegraph-alphabet.

Figures 2, 3:
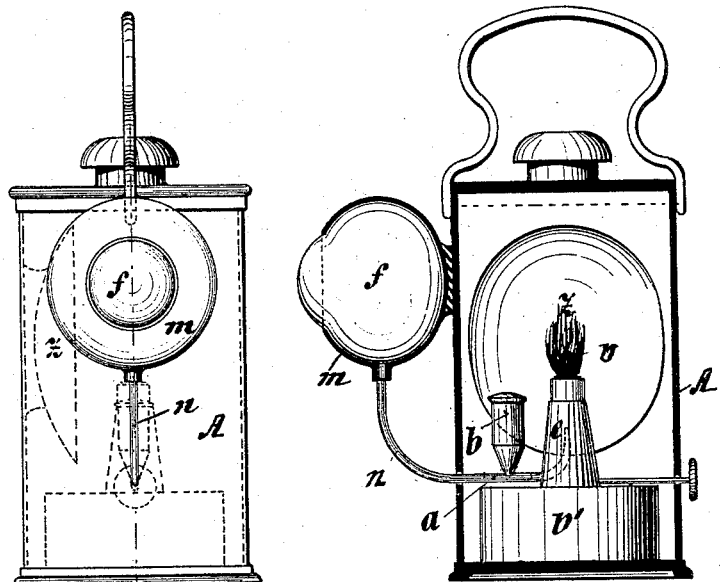

Figure 1 represents a longitudinal section of the general arrangement of my improved semaphore. Fig. 2 represents a section of a lantern with my semaphore arranged thereto. Fig. 3 is a side view of the same.

The magnesium powder to be gradually fed to the flame $v$ is contained in a casing or reservoir, $b$, the narrow discharge-pipe $d$ of which is inserted into a branch of the pipe $a$, capable of being raised or lowered. Opposite to the opening of this discharge-pipe $d$ a small truncated cone, $x$, is provided within the bore $c$ of the pipe $a$, said cone allowing only a determined very small quantity of the magnesium powder to fall down at a time from the reservoir $b$. The amount of discharge is adjustable by the position of the discharge-pipe of the reservoir toward the cone $x$. By increasing the distance the amount of discharge will be increased, and by bringing the discharge-pipe near to the cone $x$ the amount of each portion of powder will be reduced.

To one end of the pipe $a$ the jet-pipe $e$ is attached, leading to the frame $v$, and to the other end of the pipe $a$ the blast-pipe $n$ is connected, leading to a suitable blast apparatus of any kind, which, in Fig. 1 of the drawings, consists of a hollow rubber ball, $f$, provided with a suction-valve, $g$, and an exit-valve, $h$. In compressing the said ball $f$ the air therein contained is forced out through the valve $h$, blast-pipe $n$, and pipe $a$, sweeping away the small quantity of powder or dust on the cone $x$ and blowing it into the flame $v$, where it immediately burns, producing a bright flash of intensively-bright white light. On releasing the pressure on the ball $f$ the exit-valve $h$ immediately closes and prevents any fresh powder (falling from the reservoir $b$) to be forced into the blast-pipe. Said powder, on the contrary, settles on the cone $x$, and there rests until the next blast will force it forward to the flame. The ball $f$ fills with air through the suction-valve $g$, and is again ready for immediate use.

The working order of this simple apparatus will be readily understood. Blasts may be given in quick succession or at any suitable and convenient intervals at the will and control of the operator, enabling him to produce a determined succession of flashes constituting optical signals according to a predetermined scheme.

In Figs. 2 and 3 the pipe $a$, reservoir $b$, jet-pipe $e$, and flame $v$ are inclosed within a lantern-case and a reflector, $z$, placed behind the flame. The blast-ball $f$ is arranged within a casing of its own, $m$, outside the lantern, and a part of said ball-casing allows to act a pressure on the ball at convenient intervals to produce the blast and blow the magnesium powder into the flame.

For some purposes the magnesium powder may be replaced by any other suitable substance, which, when blown into the flame, burns immediately with a bright flash.

What I claim is—

An optical signaling apparatus or semaphore consisting of the combination of pipe $a$, with truncated cone $x$ within the bore of the same, reservoir $b$, containing the powder, jet-pipe $e$, flame $v$, blast-pipe $n$, and blast or elastic ball $f$, having suction-valve $g$ and exit-valve $h$, substantially as specified.

In testimony whereof I hereunto sign my name, in the presence of two subscribing witnesses, this 23d day of September, 1888.

JOHN WILLIAM CHARLES COWEN SCHIRM.

Witnesses:
HANS GUDE,
JOH. WILHELM SCHIRM.